United States Patent [19]

Matsui et al.

[11] Patent Number: 5,310,439
[45] Date of Patent: May 10, 1994

[54] PROCESS FOR BONDING A MOLDED ARTICLE OF A THERMOPLASTIC SATURATED NORBORNENE RESIN

[75] Inventors: Toshiyasu Matsui; Hidenori Yukishige, both of Yokohama; Tadao Natsuume, Yokosuka, all of Japan

[73] Assignee: Nippon Zeon Co., Ltd., Tokyo, Japan

[21] Appl. No.: 990,196

[22] Filed: Dec. 14, 1992

[30] Foreign Application Priority Data

Dec. 18, 1991 [JP] Japan ................................. 3-353040
Aug. 31, 1992 [JP] Japan ................................. 4-255570

[51] Int. Cl.$^5$ ................................................ C09J 5/02
[52] U.S. Cl. ................................. 156/307.3; 156/315; 156/329; 428/414; 525/476; 528/27
[58] Field of Search ............... 156/329, 307.3, 315; 428/414; 525/476; 528/27

[56] References Cited

U.S. PATENT DOCUMENTS

| | | | |
|---|---|---|---|
| 3,170,962 | 2/1965 | Tyler | 525/476 |
| 3,687,777 | 8/1972 | Gallagher et al. | 156/315 |
| 4,157,357 | 6/1979 | Mine et al. | 525/476 |
| 4,546,018 | 10/1985 | Ryuzo et al. | 156/329 |
| 4,981,728 | 1/1991 | Homma et al. | 525/476 |

FOREIGN PATENT DOCUMENTS

| | | |
|---|---|---|
| 370464 | 5/1990 | European Pat. Off. . |
| 45-36319 | 11/1970 | Japan . |
| 46-12154 | 3/1971 | Japan . |
| 55-13767 | 1/1980 | Japan . |
| 57-179210 | 11/1982 | Japan . |
| 58-2326 | 1/1983 | Japan . |
| 61-268720 | 11/1986 | Japan . |
| 63-273629 | 11/1988 | Japan . |
| 2-140220 | 5/1990 | Japan . |
| 2-227424 | 9/1990 | Japan . |
| 2-276842 | 11/1990 | Japan . |
| 3-14882 | 1/1991 | Japan . |
| 3-95235 | 4/1991 | Japan . |
| 3-122137 | 5/1991 | Japan . |
| 1154853 | 7/1966 | United Kingdom . |

*Primary Examiner*—John J. Gallagher
*Attorney, Agent, or Firm*—Armstrong, Westerman, Hattori, McLeland & Naughton

[57] ABSTRACT

The present invention relates to a process for bonding a molded article of a thermoplastic saturated norbornene resin in which when the molded article is bonded to an adherend widely different from the molded article in coefficient of linear expansion, the adhesion surface of the molded article and that of the adherend are stuck together with an adhesive composed mainly of an epoxy resin which has an elasticity (Shore hardness D: about 40 or less) imparted by modification with a polymer having reactive silyl groups, and then the adhesive is cured. Thus, there is provided such an excellent bonding process that the adhesive strength is hardly deteriorated by a temperature change.

12 Claims, No Drawings

PROCESS FOR BONDING A MOLDED ARTICLE OF A THERMOPLASTIC SATURATED NORBORNENE RESIN

BACKGROUND OF THE INVENTION

Field of the Invention

The present invention relates to a process for bonding a molded article of a thermoplastic saturated norbornene resin. More particularly, the present invention relates to a process for bonding a molded article of a thermoplastic saturated norbornene resin which comprises sticking together the adhesion surface of the molded article of a thermoplastic saturated norbornene resin and the adhesion surface of an adherend with an elastic epoxy-silicon based adhesive, and then curing the elastic epoxy-silicon based adhesive.

Related Art

Poly(methyl methacrylate)s (PMMA) and polycarbonates (PC) have heretofore been known as resins used as optical materials. However, PMMA is excellent in transparency but is insufficient in heat resistance, moisture resistance, etc. PC is superior to PMMA in heat resistance and moisture resistance but is disadvantageous, for example, in that it shows a marked birefregence. Therefore, there has been desired an optical material which is excellent in all of transparency, heat resistance, moisture resistance, etc. and hardly shows birefregence.

Thermoplastic saturated norbornene resins have recently been noted as optical materials which are exellent in transparency, heat resistance and moisture resistance and hardly show birefregence. However, there has been no method for bonding a molded article of a thermoplastic saturated norbornene resin tightly to an adherend. In particular, it has been impossible to bond the molded article tightly to an adherend different in coefficient of linear expansion from the thermoplastic saturated norbornene resin because in some cases, a temperature change causes peeling between an adhesive and the molded article or the adherend, or the adhesive is torn.

SUMMARY OF THE INVENTION

The present inventors earnestly investigated the adhesion between a molded article of a thermoplastic saturated norbornene resin and an adherend different from the resin in coefficient of linear expansion, and consequently found that the molded article and the adherend can be sticked together with an elastic epoxy-silicon based adhesive so tightly that the molded article and the adherend are hardly peeled from each other by a temperature change, whereby the present invention has been accomplished.

DETAILED DESCRIPTION OF PREFERRED EMBODIMENTS

According to the present invention, there is provided a process for bonding a molded article of a thermoplastic saturated norbornene resin which comprises sticking together the adhesion surface of a molded article of a thermoplastic saturated norbornene resin and the adhesion surface of an adherend with an elastic epoxy-silicon based adhesive, and then curing the elastic epoxy-silicon based adhesive.

The term "norbornene resin" referred to hereinafter includes any polymer produced from norbornene or a norbornene derivative monomer with or without a monomer(s) other than norbornene or its derivative.

Molded Article of a Thermoplastic Saturated Norbornene Resin

The molded article of a thermoplastic saturated norbornene resin used in the present invention is a molded article whose adhesion surface is made of a thermoplastic saturated norbornene resin.

The thermoplastic saturated norbornene resin used in the present invention is a resin well known through Jap. Pat. Appln. Kokai (Laid-Open) Nos. HEI 3 (1991)-14882 and HEI 3 (1991)-122137, etc. Specific examples of the thermoplastic saturated norbornene resin are hydrogenated products of polymers obtained by ring-opening polymerization of norbornene monomers, addition polymers of norbornene monomers, addition polymers of norbornene monomers and olefins, modified products of these polymers, etc.

The norbornene monomers are monomers well known through the above references and Jap. Pat. Appln. Kokai (Laid-Open) Nos. HEI 2 (1990)-227424 and HEI 2 (1990)-276842, etc., and includes, for example, norbornene, alkyl-, alkylidene- or aromatic-substituted derivatives thereof, and substituted bodies of these substituted or unsubstituted olefins which have as the substituent a polar group such as a halogen, hydroxyl group, ester group, alkoxy group, cyano group, amido group, imido group, silyl group, etc., (e.g. 2-norbornene, 5-methyl-2-norbornene, 5, 5-dimethyl-2-norbornene, 5-ethyl-2-norbornene, 5-butyl-2-norbornene, 5-ethylidene-2-norbornene, 5-methoxycarbonyl-2-norbornene, 5-cyano-2-norbornene, 5-methyl-5-methoxycarbonyl-2-norbornene, 5-phenyl-2-norbornene, and 5-phenyl-5-methyl-2-norbornene); cyclopentadiene oligomers and the same derivatives and substituted bodies as above thereof, (e.g. dicyclopentadiene, 2,3-dihydrodicyclopentadiene, 1,4:5,8-dimethano-1,2,3,4,4a,5,8-,8a-2,3-dicyclopentadieno-naphthalene, 6-methyl-1,4:5,8-dimethano-1,4,4a,5,6,7,8,8a-octahydronaphthalene, 1,4:5,10:6,9-trimethanol, 2,3,4,4a,5,5a,6,9,9a,10,-10a-dodecahydro-2,3-cyclopentadienoanthracene); and adducts of cyclopentadiene with tetrahydroindene, etc., and the same derivatives and substituted bodies as above thereof, (e.g. 1,4-methano-1,4,4a,4b,5,8,8a,9a-octahydrofluorene and 5,8-methano-1,2,3,4,4a,5,8,8a-octahydro-2,3-cyclopentadieno-naphthalene).

A conventional method may be employed for polymerizing the norbornene monomer. If necessary, the norbornene monomer can be copolymerized with other monomers copolymerizable therewith or can be made into a hydrogenated product of a thermoplastic norbornene polymer which is a thermoplastic saturated norbornene resin. The polymer or hydrogenated polymer thus obtained may be modified with an $\alpha, \beta$-unsaturated carboxylic acid and/or a derivative thereof, a styrene type hydrocarbon, an organosilicon compound having an olefinic unsaturated bond and a hydrolyzable group, or an unsaturated epoxy monomer by a method well known through Jap. Pat. Appln. Kokai (Laid-Open) HEI 3 (1991)-95235, etc.

As to the molecular weight of the polymer or the hydrogenated polymer, the number average molecular weight is suitably 10,000 to 200,000 as measured by GPC (gel permeation chromatography) analysis using cyclohexane as a solvent. When the hydrogenation is carried out, the hydrogenation rate is 90% or more, preferably 95% or more, more preferably 99% or more, for improving the resistance to deterioration by light and the resistance to deterioration by weather.

If necessary, the thermoplastic saturated norbornene resin used in the present invention may be incorporated with various additives, for example, antioxidants of phenol derivatives, phosphorus-containing compounds, etc.; heat deterioration resistors of phenol derivatives, etc; ultra-violet absorbers of benzophenone derivatives, etc.; antistatic agents of amine compounds, etc.; and lubricants such as esters of aliphatic alcohols, partial esters and partial ethers of polyhydric alcohols, etc. The thermoplastic saturated norbornene resin can be used in admixture with other resins and the like so long as the object of the present invention is not defeated. In the case of a molded article which is not required to be transparent, various fillers can be used for improving the strength, etc. When no filler is used, the coefficient of linear expansion of the thermoplastic saturated norbornene polymer is $6 \times 10^{-5}/°C$. or more, usually $7 \times 10^{-5}/°C$. or more. When a filler is used, the coefficient of linear expansion can be reduced to about $3 \times 10^{-5}/°C$., depending on the kind and amount of the filler.

A method for producing the molded article used in the present invention is not critical. There can be employed conventional molding methods of thermoplastic resins, such as injection molding, melt extrusion, hot pressing, solvent casting, drawing, etc. The molded article may be any one so long as its adhesion surface is made of the thermoplastic saturated norbornene resin. Other portions of the molded article may be made of other resins or may be formed by integral molding by inserting a metal or the like.

Adherend

The adherend used in the present invention is not critical, but for example, when no filler is used in the adherend, the coefficient of linear expansion of the adherend is preferably $0.01 \times 10^{-5}$ to $50 \times 10^{-5}/°C$., more preferably $0.1 \times 10^{-5}$ to $15 \times 10^{-5}/°C$., most preferably $1 \times 10^{-5}$ to $10 \times 10^{-5}/°C$. or more. For example, the coefficient of linear expansion of common metals such as iron, copper, aluminum and stainless steel is about $0.5 \times 10^{-5}$ to about $3.0 \times 10^{-5}/°C$., that of common practical glasses such as borosilicate glass, lead glass, quartz glass and radioprotective glass is about $0.1 \times 10^{-5}$ to about $1.5 \times 10^{-5}/°C$., that of ceramics is usually about $0.5 \times 10^{-5}$ to about $1.5 \times 10^{-5}/°C$., that of common engineering plastics such as polyphenylene sulfides obtained by the use of glass fiber or the like as a filler is usually about $1.0 \times 10^{-5}$ to about $3 \times 10^{-5}/°C$., that of common thermoplastic resins is about $6.0 \times 10^{-5}$ to about $20.0 \times 10^{-5}/°C$., that of the thermoplastic saturated norbornene resin is as described above, that of common thermosetting resins is about $2.0 \times 10^{-5}$ to about $6.0 \times 10^{-5}/°C$., and that of hard natural rubber is about $6.0 \times 10^{-5}$ to about $7.0 \times 10^{-5}/°C$.

The difference in coefficient of linear expansion between an object to be bonded and the adherend is preferably as small as possible. When a filler is used in the object to be bonded, the coefficient of linear expansion of the object to be bonded is decreased, and in proportion to this decrease, a preferable coefficient of linear expansion for the adherend is also decreased. When the coefficient of linear expansion of the adherend is widely different from that of the object to be bonded, the adherend and the object to be bonded are different from each other in the degrees of expansion and shrinkage, resulting in a load on an adhesive. Therefore, in an environment in which a temperature change takes place, the adhesion is decreased with the lapse of time. However, according to the bonding process of the present invention, the adhesive have a certain degree of rubber elasticity and adheres strongly to the object to be bonded comprising the thermoplastic saturated norbornene resin. Therefore, the adhesion is hardly decreased, so that the object to be bonded and the adherend are hardly peeled from each other.

Primer

In the present invention, a strong adhesion can be attained by forming a primer layer by treating the adhesion surface made of the thermoplastic saturated norbornene resin of the molded article with a primer solution before applying the elastic epoxy-silicon based adhesive. Particularly when the molded article of the thermoplastic saturated norbornene resin is bonded to an adherend widely different in coefficient of linear expansion from the thermoplastic saturated norbornene resin, in an environment in which a temperature change takes place, peeling due to the temperature change hardly occurs in the case of employing the bonding process of the present invention, and it more hardly occurs in the case of forming the primer layer.

As the primer solution used in the present invention, there can be used solutions in an organic solvent such as toluene of commercially available UNISTOL P-401 (mfd. by Mitsui Petrochemical Industries Ltd.), HARDLEN B-13, HARDLEN MLJ-13 (both mfd. by TOYO KASEI KOGYO, CO., LTD), a commercially available $C_9$ petroleum resin FTR6100 (mfd. by Mitsui Petrochemical Industries Ltd.), a terpene phenol resin YS POLYSTAR T115 (mfd. by Yasuhara Yushi Co., Ltd.), etc.

Such primers usable in the present invention are mainly cyclopentadiene-, olefin- or diene-type polymers having polar groups, etc.

In the primers composed of the cyclopentadiene-, olefin- or diene-type polymer having polar groups, the cyclopentadiene as base includes, for example, cyclopentadiene, methyl-substituted cyclopentadiene, ethyl-substituted cyclopentadiene, and dimers and trimers thereof; the olefin as base includes, for example, ethylene and propylene; and the diene as base includes, for example, butadiene and isoprene.

The cyclopentadiene-, olefin- or dienepolymers having polar groups are obtained by introducing the polar groups into olefin- or diene-polymer. They may also be polymers obtained by using cyclopentadiene, an olefin or a diene, which has a polar group, as a comonomer in polymerization. Examples of the polar group are halogens, acryl group, carboxyl group, epoxy group, amino group, acid anhydride groups, acetyl group, etc. Preferable examples of the polar group are halogens, acryl group, carboxyl group, etc. As a method for introducing the polar groups into the olefin- or diene-polymer, there can be exemplified substitution, addition, terminal modification and graft polymerization. The olefin having a polar group includes vinyl acetate, vinyl chloride, acrylonitrile, etc. The diene having a polar group includes chloroprene, etc. For producing the cyclopentadiene type resin, it is also possible to copolymerize a cyclopentadiene monomer with a monomer copolymerizable therewith, for example, a hydroxyl group-containing monomer such as allyl alcohol or vinylphenol; a carboxyl group-containing monomer such as acrylic acid, itaconic acid or maleic anhydride; an ester linkage-containing monomer such as vinyl acetate, ethyl acrylate or butyl methacrylate; an unsaturated cyanide such as acrylonitrile; or a polar vinyl monomer such as an unsaturated ether (e.g. allyl glycidyl ether).

The number average molecular weight of the cyclopentadiene polymer with polar groups used as primer in the present invention is usually 200 to 1,000, preferably 230 to 800, more preferably 260 to 600, as measured by gel permeation chromatography with polystyrene calibration. The number of the polar groups contained in the polymer is usually 0.1 to 1, preferably 0.2 to 0.8, more preferably 0.3 to 0.6, per 100 of the molecular weight. The softening point of the polymer is usually 40°–220° C., preferably 60°–180° C., more preferably 80°–150° C. It is preferable to hydrogenate the polymer previously by a conventional method.

The molecular weight of the olefin- or dienepolymer with polar groups used as primer in the present invention is usually 5,000 to 200,000, preferably 10,000 to 150,000, more preferably 20,000 to 100,000. The number of the polar groups contained in the polymer is usually 0.5 to 1.5, preferably 0.6 to 1.2, more preferably 0.7 to 0.9, per 100 of the molecular weight.

When the molecular weight of the cyclopentadiene-, olefin- or diene-polymer with polar groups used as primer in the present invention is too low, the strength of the primer layer is low. When the molecular weight is too high, the viscosity of the primer solution is too high, so that the coating workability is low. When the number of the polar groups contained in the polymer is too small, the adhesion is low. When the number is too large, the drape of the primer layer with a coating layer is not good.

The primer is used in the form of a solution in a solvent. The concentration of the solution is usually 1 to 30% by weight, preferably 2 to 20% by weight, more preferably 3 to 10% by weight. Although the solvent is not critical, it is preferable to use a poor solvent for thermoplastic saturated norbornene resins, for example, when the molded article of a thermoplastic saturated norbornene resin is used as an optical material, or when the primer concentration is low and a large amount of the primer solution is applied on the molded article. The term "poor solvent for thermoplastic saturated norbornene resins" used in the present specification means a solvent which does not substantially attack a thermoplastic saturated norbornene resin when applied thereon. For example, toluene is a good solvent for thermoplastic saturated norbornene resins, but a mixed solvent obtained by diluting toluene to a concentration of 70% by weight or less with methyl isobutyl ketone does not substantially attack a thermoplastic saturated norbornene resin when applied on the thermoplastic saturated norbornene resin. Such a mixed solvent is a poor solvent for the thermoplastic saturated norbornene resin used in the present invention and is preferable as the solvent. However, when the molded article is not used as an optical material, or when a primer solution having a relatively high concentration is used so as to form a thin primer layer, toluene can be used as it is as the solvent without any trouble in some cases even if the surface of the molded article of the thermoplastic saturated norbornene resin is attacked a little, because the amount of toluene used is small.

A method for applying the primer solution is not critical. For example, spraying, immersion, spin coating, roll coating, etc. can be employed.

When a volatile component is contained in the solvent, the solvent is sufficiently dried until the volatile component in the solvent is virtually volatilized. A method for the drying is not critical.

As to the amount of the primer solution applied, it is applied to a thickness of usually 1 to 20 $\mu$m, preferably about 2 to about 10 $\mu$m. When a volatile component is contained in the solvent, it is preferable to attain the above thickness after sufficient drying.

Elastic Epoxy-Silicon Based Adhesive

The elastic epoxy-silicon based adhesive used in the present invention is an adhesive composed mainly of an epoxy resin which has elasticity imparted by modification with a polymer having reactive silyl groups. Said adhesive has a Shore hardness D of about 40 or less, preferably about 5 to about 35, more preferably about 7 to about 30. Specific examples of the elastic epoxy-silicon type adhesive are BOND MOS7, BOND MOS10, BOND MOS1001 (mfd. by KONISHI CO., LTD), Cemedine PM200, Cemedine PM300, Cemedine EP-001 (mfd. by CEMEDIN CO., LTD), etc.

For producing such an elastic epoxy-silicon based adhesive, a conventional method may be employed. For example, as disclosed in Jap. Pat. Appln. Kokai (Laid-Open) No. SHO 58 (1983)-2326, the adhesive can be obtained by reacting (a) a polymer which has a crosslinkable and polymerizable silicon-containing group at the end and whose main chain is substantially a polyether, (b) a silicone-modified epoxy resin, and (c) a curing catalyst. The component (a) is that disclosed in Jap. Pat. Pub. No. SHO 45 (1970)-36319 and is preferably one which has a molecular weight of 300 to 20,000, comprises a polyoxypropylene as polyether of the main chain, and has an alkoxysilyl group as the terminal hydrolyzable group. The component (b) is a resin obtained by reacting a compound having in the molecule two or more epoxy functional groups on an average, such as an epoxy resin with a silicone compound having a functional group reactive with an epoxy functional group, such as mercapto group. The component (c) is, for example, tin octylate or alkyl titanate. The elastic epoxy-silicon based adhesive can be obtained by mixing 100 parts by weight of the component (a), 0.01 to 20 parts by weight of the component(b) and 0 to 10 parts by weight of the component (c), and subjecting the mixture to reaction.

As disclosed in Jap. Pat. Appln. Kokai (Laid-Open) No. HEI 2 (1990)-140220, the elastic epoxy-silicon based adhesive can be obtained also by reacting (a) a rubber organic polymer having crosslinkable divalent alkoxysilyl groups, (b) an epoxy resin, (c) a silanol condensation catalyst, (d) an epoxy resin curing agent, and (e) a hardening-resin composition containing a silicon compound having a functional group reactive with an epoxy group and a divalent alkoxysilyl group. The component (a) is a polymer comprising, for example, a polyether type skeleton obtained by polymerization of a cyclic ether such as propylene oxide, a polyester type skeleton obtained by condensation of a dibasic acid such as adipic acid and glycol or ring-opening polymerization of a lactone, or an ethylene-propylene copolymer type skeleton. Specific examples of the component (a) are the polymers disclosed, for example, in Jap. Pat. Pub. No. SHO 46 (1971)-12154 and Jap. Pat. Appln.

Kokai (Laid-Open) Nos. SHO 55 (1980)-13767 and SHO 57 (1982)-179210. The component (b) is a conventional epoxy resin. The component (c) is a well-known silanol condensation catalyst such as a titanic acid ester (e.g. tetravinyl titanate). The component (d) is a well-known curing agent for epoxy resin, such as diaminodiphenylsulfone, 2,4,6-tris-(dimethylaminomethyl)-phenol, or the like. The component (e) is a silane coupling agent, for example, γ-aminopropyl methyldimethoxy silane or β-carboxyethyl methyldiethoxy silane. The elastic epoxy-silicon based adhesive can be obtained by mixing 100 part by weight of the component (a), 70 to 500 parts by weight of the component (b), 0.1 to 20 parts by weight of the component (c), the component (d) in an amount of 0.1 to 300 parts by weight per 100 parts by weight of the component (b), and the component (e) in an amount of 0.1 to 20 parts by weight per 100 parts by weight of the sum of the component (a) and the component (b).

The elastic epoxy-silicon based adhesive can be obtained also by the methods disclosed in Jap. Pat. Appln. Kokai (Laid-Open) Nos. SHO 61 (1986)-268720 and SHO 63 (1988)-273629, etc. If necessary, the adhesive may be contain compatibilizers, fillers, plasticizers, aditives, etc. When as described hereinafter, the adhesive is used in the form of two liquids, the compatibilizers, fillers, plasticizers, additives, etc. may be contained in either one or both of the liquids. In this case, for making the mixing proportions of the two liquids adjustable, the proportions of the above-mentioned components in the two liquids are usually adjusted by addition of the compatibilizers, fillers, plasticizers, additives, etc. so that when equal volumes of the two liquids are mixed, the components may be contained in the resulting mixture in the above-mentioned proportions.

Tackifier

In the present invention, the adhesion can be improved by using the elastic epoxy-silicon based adhesive in admixture with a tackifier compatible therewith. Specific examples of the tackifier are $C_5$ petroleum resins, $C_9$ petroleum resins, $C_5$, $C_9$ copolymer petroleum resins, xylene resins, rosin ester resins, phenolic resins, terpene phenol resins, phenol-modified resins, compounds similar to the above-mentioned primer, etc. Although depending on the kind of the tackifier, the amount of the tackifier added is, in general, preferably 5 to 50% by weight, more preferably 10 to 25% by weight. When the amount of the tackifier is too small, no adhesion-improving effect can be obtained. When the amount is too large, the elastic epoxy-silicon based adhesive is excessively diluted, resulting in a low adhesion.

Adhesion method

A method for sticking together the adhesion surface of the molded article of a thermoplastic saturated norbornene resin and the adhesion surface of the adherend with the elastic epoxy-silicon based adhesive and then curing the adhesive, is not critical. For example, the components (a), (b) and (c) disclosed in the above Jap. Pat. Appln. Kokai (Laid-Open) No. SHO 58 (1983)-2326 are prepared, mixed and then stored in a substantially anhydrous state, and the mixture stored is applied on one or both of the adhesion surfaces, immediately after which the adhesion surfaces are stuck together and fixed. The adhesive absorbs water in the air to cure, whereby the adhesion is achieved. However, it is difficult to store the components in a substantially anhydrous state, and hence for preventing the components from reacting with one another, the components are usually separated and stored in the form of two liquids, i.e., a liquid containing the component (a) and a liquid containing the components (b) and (c); or a liquid containing the components (a) and (c) and a liquid containing the component (b). The two liquids are mixed immediately before use and applied on one or both of the adhesion surfaces, immediately after which the adhesion surfaces are stuck together and fixed. Thus, the adhesion is achieved. It is also possible to mix the two liquids on one or both of the adhesion surfaces, stick the adhesion surfaces together immediately, and fix them. Usually, the elastic epoxy-silicon based adhesive disclosed in Jap. Pat. Appln. Kokai (Laid-Open) No. HEI 2 (1990)-140220 is also stored in the form of two liquids which are mixed immediately before use. On the other hand, there are also elastic epoxy-silicon based adhesives which can be stored in the form of one liquid, as described in Jap. Pat. Appln. Kokai (Laid-Open) No. SHO 63 (1988)-273629.

The amount of the adhesive applied is 100 to 300 $g/m^2$, preferably 150 to 250 $g/m^2$.

When curing is conducted while fixing the adhesion surfaces at room temperature, the adhesive strength increases with the lapse of time until about the seventh day. Therefore, curing is conducted for 1 hour to 10 days, preferably 12 hours to 8 days, more preferably 1 to 7 days. When curing is conducted at as high a temperature as possible in a temperature range in which the molded article and the adherend are heat-resistant, namely at a temperature of usually 100° C. or lower, the increase of the adhesive strength is accelerated. Therefore, curing at such a temperature is preferable for raising the efficiency. However, when an object to be bonded and the adherend are widely different from each other in coefficient of linear expansion, curing at a definite temperature is preferable. When the difference is especially wide, it is preferable to employ a curing temperature close to a temperature at which the bonded product is used.

EXAMPLE

The present invention is more specifically illustrated with the following reference examples, examples and comparative examples. Adhesive strength under shear was measured by means of a TCM universal tension and compression testing machine (mfd. by SHINKOH TSUSHIN CO., LTD) and expressed as the average of measured values obtained for 5 sets of samples, unless otherwise specified.

REFERENTIAL EXAMPLE 1

To 100 parts by weight of a polymer (number average molecular weight: 28,000, hydrogenation rate: about 100%, glass transition temperature: 152° C.) obtained by hydrogenating a polymer obtained by ring-opening polymerization of 6-methyl-1,4;5,8;-dimethano-1,4,4a,5,6,7,8,8a-octahydronaphthalene was added 0.2 part by weight of a phenolic antioxidant pentaerythrityl tetrakis(3-(3,5-di-tert-butyl-4-hydroxyphenyl)propionate). The resulting mixture was pelletized by melt extrusion.

The pellets thus obtained were injection-molded under the following conditions to obtain test pieces N which were 3 mm (thickness)×9 mm×41 mm plate-shaped molded articles:

Molding machine: clamping pressure 65 tons
Resin temperature: 325° C.
Mold temperatures: 110° C. (fixed mold) 100° C. (movable mold)

EXAMPLE 1

Adhesion between two of the test pieces N obtained in Reference Example 1 was carried out as follows. A 9 mm×20 mm surface portion at the end of each test piece was used as an adhesion surface. The two liquids (liquid A and liquid B) of Cemedine EP-001 (an elastic epoxy-silicon based adhesive mfd. by CEMEDINE CO, LTD) were mixed in the ratio of 1:1 by volume and immediately applied on the adhesion surface of one of the test piece in an amount of 200 g/m². The adhesion surfaces of the test pieces were stuck together so that the other end (the end opposite to the adhesion surface) of one of the test piece might be placed in a direction opposite to the direction of the other end of the other test piece. Then, the test pieces were fixed by means of a clip [a double-clip (small) CP-105, 35-483, mfd. by PLUS CO, LTD], followed by curing at 20° C. for 7 days, whereby the test pieces were bonded together. The adhesive strength under shear between the test pieces N was 8.1 kg/cm².

EXAMPLE 2

Adhesion was carried out in the same manner as in Example 1 except for using MOS7 (an elastic epoxy-silicon based adhesive, mfd. by) in place of Cemedine EP-001. The adhesive strength under shear between the test pieces N was 7.8 kg/cm².

COMPARATIVE EXAMPLE 1

Adhesion was carried out in the same manner as in Example 1, except that in place of the test pieces N obtained in Referential Example 1, there were used test pieces E made of a polyethylene which had the same shape and dimensions as those of the test pieces N. The adhesive strength under shear between the test pieces E was 3.6 kg/cm².

COMPARATIVE EXAMPLE 2

Adhesion was carried out in the same manner as in Example 1, except that in place of the test pieces N obtained in Referential Example 1, there were used test pieces P made of a polypropylene which had the same shape and dimensions as those of the test pieces N. The adhesive strength under shear between the test pieces P was 3.1 kg/cm².

EXAMPLE 3

Adhesion was carried out in the same manner as in Example 1, except that before the application of Cemedine EP-001, a primer (UNISTOL P-401, mfd. by Mitsui Petroleum Chemical Industries Ltd.) was applied with a brush on both of the adhesion surfaces of two of the test pieces N obtained in Referential Example 1, so as to adjust its thickness after drying to about 10 μm, and was sufficiently dried by allowing the test pieces to stand at room temperature for 30 minutes. The adhesive strength under shear between the test pieces N was 18.4 kg/cm².

EXAMPLE 4

Adhesion was carried out in the same manner as in Example 3 except for using BOND MOS7 in place of Cemedine EP-001. The adhesive strength under shear between the test pieces N was 18.2 kg/cm².

COMPARATIVE EXAMPLE 3

Adhesion was carried out in the same manner as in Example 3, except that in place of the test pieces N obtained in Referential Example 1, there were used test pieces E made of a polyethylene which had the same shape and dimensions as those of the test pieces N. The adhesive strength under shear between the test pieces E was 3.2 kg/cm².

COMPARATIVE EXAMPLE 4

Adhesion was carried out in the same manner as in Example 3, except that in place of the test pieces N obtained in Referential Example 1, there were used test pieces P made of a polypropylene which had the same shape and dimensions as those of the test pieces N. The adhesive strength under shear between the test pieces P was 10.4 kg/cm².

EXAMPLE 5

Adhesion was carried out in the same manner as in Example 1, except that in place of Cemedine EP-001, there was used a mixture of 100 parts by weight of liquid B of Cemedine EP-001 and 140 parts by weight of a residue obtained by mixing 100 parts by weight of liquid A of Cemedine EP-001 with 140 parts by weight of a 30% solution of $C_9$ petroleum resin (FTR6100, mfd. by Mitsui Petrochemical Industries Ltd.) in toluene and distilling off the solvent for the primer by the use of a rotary evaporator while reducing the pressure by means of an aspirator, that in place of the test pieces N obtained in Referential Example 1, there was used a combination of the test piece N (coefficient of linear expansion: $7.2 \times 10^{-5}/°C$.) and a ceramic test piece C (coefficient of linear expansion: $0.70 \times 10^{-5}/°C$.) having the same shape and dimensions as those of the test piece N, and that the curing time was changed from 7 days to 24 hours. The adhesive strength under shear between the test piece N and the test piece C was 17.2 kg/cm².

EXAMPLE 6

Adhesion was carried out in the same manner as in Example 1, except that in place of the test pieces N obtained in Referential Example 1, there were used a combination of the test piece N (coefficient of linear expansion: $7.2 \times 10^{-5}/°C$.) and a ceramic test piece C (coefficient of linear expansion: $0.70 \times 10^{-5}/°C$.) having the same shape and dimensions as those of the test piece N, and that the curing time was changed from 7 days to 24 hours. The adhesive strength under shear between the test piece N and the test piece C thus bonded together was 5.8 kg/cm².

When 5 samples of the assembly of the test pieces N and C thus obtained were subjected to 5 repetitions of a heat cycle of −30° C. for 30 minutes and 70° C. for 30 minutes, three of the 5 samples underwent peeling but the remaining two samples had an adhesive strength under shear of 4.4 kg/cm² or 4.2 kg/cm², respectively.

EXAMPLE 7

Adhesion was carried out in the same manner as in Example 5, except that before the adhesion, a primer (UNISTOL P-401) was applied on the adhesion surface of test piece N to a thickness of 10 μm and dried by allowing the thus treated test piece N to stand for 30 seconds. The adhesive strength under shear between the test piece N and the test piece C thus bonded together was 20.4 kg/cm$^2$.

After the test pieces N and C bonded together were subjected to 100 repetitions of the heat cycle in the same manner as in Example 6, the adhesive strength under shear between the test pieces N and C was 29.6 kg/cm$^2$.

EXAMPLE 8

Adhesion was carried out in the same manner as in Example 7 except for using another commercial product (HARDLEN B-13, mfd. by TOYO KASEI KOGYO CO., LTD) in place of the primer used in Example 7. The adhesive strength under shear between the test piece N and the test piece C thus bonded together was 28.9 kg/cm$^2$.

After the test pieces N and C bonded together were subjected to 100 repetitions of the heat cycle in the same manner as in Example 6, the adhesive strength under shear between the test pieces N and C was 46.4 kg/cm$^2$.

EXAMPLE 9

Adhesion was carried out in the same manner as in Example 6, except that in place of Cemedine EP-001, there was used a mixture of 100 parts by weight of liquid B of Cemedine EP-001 and 140 parts by weight of a residue obtained by mixing 100 parts by weight of liquid A of Cemedine EP-001 with 140 parts by weight of a primer (HARDLEN B-13) and distilling off the solvent for the primer by the use of a rotary evaporator while reducing the pressure by means of an aspirator. The adhesive strength under shear between the test piece N and the test piece C thus bonded together was 7.2 kg/cm$^2$.

After the test pieces N and C bonded together were subjected to 100 repetitions of the heat cycle in the same manner as in Example 6, the adhesive strength under shear between the test pieces N and C was 11.0 kg/cm$^2$.

REFERENTIAL EXAMPLE 2

A mixture of 70 parts by weight of dicyclopentadiene and 30 parts by weight of acrylic acid was subjected to reaction at 260° C. for 4 hours under nitrogen in an autoclave, and an easily volatile component was removed from the reaction mixture by distillation under reduced pressure at 250° C. and 20 mmHg. Then, an oily polymer was volatilized at 280° C. and 10 mmHg to obtain a resinous polymer [number average molecular weight (GPC with polystyrene calibration): 460, softening temperature: about 120° C.].

EXAMPLE 10

Adhesion was carried out in the same manner as in Example 9, except that a 30% solution in toluene of the resinous polymer obtained in Referential Example 2 was used in place of the primer (HARDLEN B-13). The adhesive strength under shear between the test piece N and the test piece C thus bonded together was 17.2 kg/cm$^2$.

After the test pieces N and C bonded together were subjected to 100 repetitions of the heat cycle in the same manner as in Example 6, the adhesive strength under shear between the test pieces N and C was 23.1 kg/cm$^2$.

COMPARATIVE EXAMPLE 5

Adhesion was carried out in the same manner as in Example 6, except that in place of Cemedine EP-001, there was used an epoxy adhesive (ARALDITE 10 MINUTES, mfd. by Showa Kobunshi Co., Ltd.) which was not an elastic epoxy-silicon based adhesive. The adhesive strength under shear between the test piece N and the test piece C thus bonded together was 2.8 kg/cm$^2$.

When 5 samples of the assembly of the test pieces N and C thus obtained were subjected to 5 repetitions of the heat cycle in the same manner as in Example 6, all the samples underwent peeling.

COMPARATIVE EXAMPLE 6

Adhesion was carried out in the same manner as in Comparative Example 5, except that before the adhesion, a primer (UNISTOL P-401) was applied on the adhesion surface of the test piece N to a thickness of about 10 $\mu$m with a brush and dried by allowing the thus treated test piece N to stand for 30 minutes. The adhesive strength under shear between the test piece N and the test piece C thus bonded together was 14.5 kg/cm$^2$.

When 5 samples of the assembly of the test pieces N and C thus obtained were subjected to 5 repetitions of the heat cycle in the same manner as in Example 6, all the samples underwent peeling.

REFERENTIAL EXAMPLE 3

A composition A was prepared by mixing 100 parts by weight of a rubber organic polymer having divalent alkoxysilyl groups (SYLYL SAT200, mfd. by KANEGAFUCHI CHEMICAL INDUSTRY CO., LTD.) with 80 parts by weight of an epoxy resin (Epikote 828, mfd. by YUKA SHELL EPOXY KABUSHIKIKAISHA). A composition B was prepared by mixing 1 part by weight of a silanol condensation catalyst (SYLYL CURING AGENT #918, mfd. by SANKYO ORGANIC CHEMICALS CO., LTD), 5 parts by weight of an epoxy curing agent (2,4,6-tris-(dimethylaminomethyl)phenol, DMP30, mfd. by ROHM & HAAS Co.) and 1 part by weight of a compatibilizer (aminosilane).

EXAMPLE 11

Adhesion was carried out in the same manner as in Example 1, except that a mixture of 180 parts by weight of the composition A and 7 parts by weight of the composition B which had been prepared in Referential Example 3 was used as an adhesive in place of Cemedine EP-001. The adhesive strength under shear between the test pieces N thus bonded together was 6.1 kg/cm$^2$. After being cured, the adhesive used in the present example had a Shore hardness of about 10.

EXAMPLE 12

Adhesion was carried out in the same manner as in Example 11, except that in place of the adhesive used in Example 11, there was used as adhesive a mixture obtained by adding 30 or 100 parts by weight of a terpene phenol resin (YS POLYSTAR T-100, mfd. by Yasuhara Yushi Co., Ltd.) to 187 parts by weight of the same mixture of the composition A and the composition B as used in Example 11. When the amount of the terpene phenol resin added was as described above, the adhesive strength under shear between the test pieces N thus bonded together was 20.5 kg/cm$^2$ or 36.1 kg/cm$^2$, respectively. After being cured, the adhesive used in the present example had a Shore hardness of about 10 in both of the above cases.

EXAMPLE 13

Adhesion was carried out in the same manner as in Example 11, except that in place of the adhesive used in Example 11, there was used as adhesive a mixture obtained by adding 30 parts by weight of a $C_5$, $C_9$ copolymer petroleum resin (TACK-ACE F-100, mfd. by Mitsui Petrochemical Industries Ltd.) to 187 parts by weight of the same mixture of the composition A and the composition B as used in Example 11. The adhesive strength under shear between the test pieces N thus bonded together was 11.9 kg/cm$^2$. After being cured, the adhesive used in the present example had a Shore hardness of about 10.

EXAMPLE 14

Adhesion was carried out in the same manner as in Example 11, except that in place of the adhesive used in Example 11, there was used as adhesive a mixture obtained by adding 30 parts by weight of a $C_5$ petroleum resin (QUINTONE QN1500, mfd. by Nippon Zeon Co., Ltd.) to 187 parts by weight of the same mixture of the composition A and the composition B as used in Example 11. The adhesive strength under shear between the test pieces N thus bonded together was 13.6 kg/cm$^2$. After being cured, the adhesive used in the present example had a Shore hardness of about 10.

EXAMPLE 15

Adhesion was carried out in the same manner as in Example 11, except that in place of the adhesive used in Example 11, there was used as adhesive a mixture obtained by adding 15, 30, 50 or 100 parts by weight of a rosin ester resin (SUPERESTER A100, mfd. by Arakawa Chemical Co., Ltd.) to 187 parts by weight of the same mixture of the composition A and the composition B as used in Example 11. When the amount of the rosin ester resin added was as described above, the adhesive strength under shear between the test pieces thus bonded together was 6.6kg/cm$^2$, 18.0 kg/cm$^2$, 10.0 kg/cm$^2$, or 13.1 kg/cm$^2$, respectively. After being cured, the adhesive used in the present example had a Shore hardness of about 10 in all of the above cases.

The above results prove the following. When bonding is conducted by the process for bonding a molded article of a thermoplastic saturated norbornene resin of the present invention, a strong adhesion can be attained. Moreover, when a molded article of a thermoplastic saturated norbornene resin is bonded to an adherend widely different from the molded article in coefficient of linear expansion by said process, the adhesive strength is hardly deteriorated by a temperature change.

What is claimed is:

1. A process for bonding a molded article of a thermoplastic saturated norbornene resin which comprises sticking together the adhesion surface of the molded article of a thermoplastic saturated norbornene resin and the adhesion surface of an adherend with an elastic epoxy-silicon based adhesive, and then curing the elastic epoxy-silicon based adhesive.

2. A process for bonding a molded article of a thermoplastic saturated norbornene resin according to claim 1, wherein the elastic epoxy-silicon based adhesive has a Shore hardness D of 40 or less.

3. A process for bonding a molded article of a thermoplastic saturated norbornene resin according to claim 1, wherein the elastic epoxy-silicon based adhesive is one which is obtained by mixing 100 parts by weight of (a) a polymer which has a crosslinkable and hydrolyzable silicon-containing group at the end and whose main chain is substantially a polyether, (b) 0.01 to 20 parts by weight of a silicone-modified epoxy resin, and (c) 0 to 10 parts by weight of a curing catalyst.

4. A process for bonding a molded article of a thermoplastic saturated norbornene resin according to claim 1, wherein the elastic epoxy-silicon based adhesive is one which is obtained by mixing 100 parts by weight of (a) a rubber organic polymer having crosslinkable divalent alkoxysilyl groups, (b) 70 to 500 parts by weight of an epoxy resin, (c) 0.1 to 20 parts by weight of a silanol condensation catalyst, (d) an epoxy resin curing agent in an amount of 0.1 to 30 parts by weight per 100 parts by weight of the component (b), and (e) a curable composition containing a silicon compound having a functional group reactive with an epoxy group and a divalent alkoxysilyl group, in a amount of 0.1 to 20 parts by weight per 100 parts by weight of the sum of the component (a) and the component (b).

5. A process for bonding a molded article of a thermoplastic saturated norbornene resin according to claim 1, wherein the elastic epoxy-silicon based adhesive contains a tackifier compatible with the adhesive.

6. A process for bonding a molded article of a thermoplastic saturated norbornene resin according to claim 5, wherein the tackifier is a member selected from the group consisting of a $C_5$ petroleum resin, a $C_9$ petroleum resin, $C_5$, $C_9$ copolymer petroleum resin, a xylene resin, a rosin ester resin, a phenolic resin, a terpene phenol resin, a phenol-modified resin, a cyclopentadienepolymer having polar groups, on olefinpolymer having polar groups and diene polymer having polar groups.

7. A process for bonding a molded article of a thermoplastic saturated norbornene type resin according to claim 5, wherein the content of the tackifier is 5 to 50% by weight.

8. A process for bonding a molded article of a thermoplastic saturated norbornene resin according to claim 1, wherein a primer layer is previously formed on the adhesion surface of the molded article of a thermoplastic saturated norbornene resin.

9. A process for bonding a molded article of a thermoplastic saturated norbornene resin according to claim 8, wherein the primer is a cyclopentadiene-, olefin-or diene polymer having polar groups.

10. A process for bonding a molded article of a thermoplastic saturated norbornene resin according to claim 8, wherein the thickness of the primer layer is 1 to 20 μm.

11. A process for bonding a molded article of a thermoplastic saturated norbornene resin according to claim 1, wherein the elastic epoxy-silicon based adhesive is applied on one or each of the adhesion surfaces in an amount of 100 to 300 g/m$^2$, and then the adhesion surfaces are sticked together.

12. A process for bonding a molded article of a thermoplastic saturated norbornene resin according to claim 1, wherein curing is conducted at room temperature or a higher temperature for 1 hour to 10 days after the sticking.

* * * * *